United States Patent
Agarwa et al.

(10) Patent No.: US 10,003,691 B1
(45) Date of Patent: Jun. 19, 2018

(54) ON-DEMAND GENERATION OF A CONTACT CENTER

(71) Applicant: Amazon Technologies, Inc., Seattle, WA (US)

(72) Inventors: Saket Agarwa, Redmond, WA (US); Pasquale DeMaio, Bellevue, WA (US); Joseph Daniel Sullivan, Seattle, WA (US); Jon Russell Jay, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/383,831

(22) Filed: Dec. 19, 2016

(51) Int. Cl.
| | |
|---|---|
| *H04M 3/00* | (2006.01) |
| *H04M 5/00* | (2006.01) |
| *H04M 3/42* | (2006.01) |
| *H04M 3/51* | (2006.01) |
| *H04L 29/12* | (2006.01) |
| *H04M 3/22* | (2006.01) |
| *G06F 21/45* | (2013.01) |
| *H04L 9/08* | (2006.01) |

(52) U.S. Cl.
CPC ............ *H04M 3/51* (2013.01); *G06F 21/45* (2013.01); *H04L 61/605* (2013.01); *H04M 3/2218* (2013.01); *H04M 3/5183* (2013.01); *H04L 9/0861* (2013.01); *H04M 2203/558* (2013.01)

(58) Field of Classification Search
CPC ... G06F 21/45; H04M 2203/558; H04M 3/51; H04M 3/2218; H04L 61/605; H04L 9/0861

USPC .......................... 379/201.03, 265.01, 265.02
See application file for complete search history.

(56) References Cited

U.S. PATENT DOCUMENTS

| | | | | |
|---|---|---|---|---|
| 8,606,245 | B1* | 12/2013 | Eccelston | H04M 3/5158 455/414.1 |
| 2003/0021415 | A1* | 1/2003 | Torvinen | H04M 3/42221 380/255 |
| 2003/0194075 | A1* | 10/2003 | McGrath | H04M 3/42 379/218.01 |
| 2004/0161086 | A1* | 8/2004 | Buntin | H04L 12/4633 379/189 |

(Continued)

OTHER PUBLICATIONS

The PCT Search Report and Written Opinion dated Mar. 23, 2018 for PCT application No. PCT/US2017/067109, 11 pages.

*Primary Examiner* — Khai N Nguyen
(74) *Attorney, Agent, or Firm* — Lee & Hayes, PLLC

(57) ABSTRACT

Technologies are disclosed for providing an onboarding service within a service provider network for on-demand creation of a contact center. Information associated with an account of a user at the service provider network is utilized to begin creating the contact center. Based upon input from the user, a directory of authorized users and storage for the contact center are created using services available within the service provider network. Encryption keys are created for encrypting customer call recordings and customer phone numbers in the storage. An initial user for handling calls is specified and a call queue is created. A routing profile is created to route calls from the call queue to the initial user. Available phone numbers are provided to the user for the selection of a phone number for accessing the contact center. One this data has been specified, the contact center can be activated for use.

20 Claims, 9 Drawing Sheets

(56) References Cited

U.S. PATENT DOCUMENTS

| | | | | |
|---|---|---|---|---|
| 2005/0129208 A1* | 6/2005 | McGrath | ............... | H04M 3/42 |
| | | | | 379/218.01 |
| 2006/0221941 A1* | 10/2006 | Kishinsky | ............ | H04M 3/523 |
| | | | | 370/352 |
| 2011/0182283 A1* | 7/2011 | Van Buren | ......... | H04M 3/4936 |
| | | | | 370/352 |
| 2014/0079207 A1* | 3/2014 | Zhakov | .............. | H04M 3/5175 |
| | | | | 379/265.03 |
| 2016/0191705 A1* | 6/2016 | Kumar | ............. | H04M 3/42153 |
| | | | | 379/265.02 |
| 2016/0349932 A1* | 12/2016 | Gorny | ................. | G06F 3/0481 |

* cited by examiner

ON-DEMAND GENERATION OF A CONTACT CENTER

BACKGROUND

Contact centers allow for customers to contact businesses and organizations, generally via telephone calls but other methods may be used for customers to contact the contact center. Calls come into the contact center and if an appropriate agent is not available to handle the call immediately, the call may be routed to a call queue.

Agents may be associated with specific call queues and thus, calls may be routed from the call queues to an appropriate agent based upon a routing profile defined at the contact center. Calls between customers and agents may be recorded, as well as other data related to incoming calls, and therefore data storage is generally required for the contact center.

Creating and starting up a contact center can involve a large amount of work and information gathering. Currently, creating and starting up a contact center can take anywhere from several days to several weeks to upwards of several months.

The disclosure made herein is presented with respect to these and other considerations.

DETAILED DESCRIPTION

Figure 1:
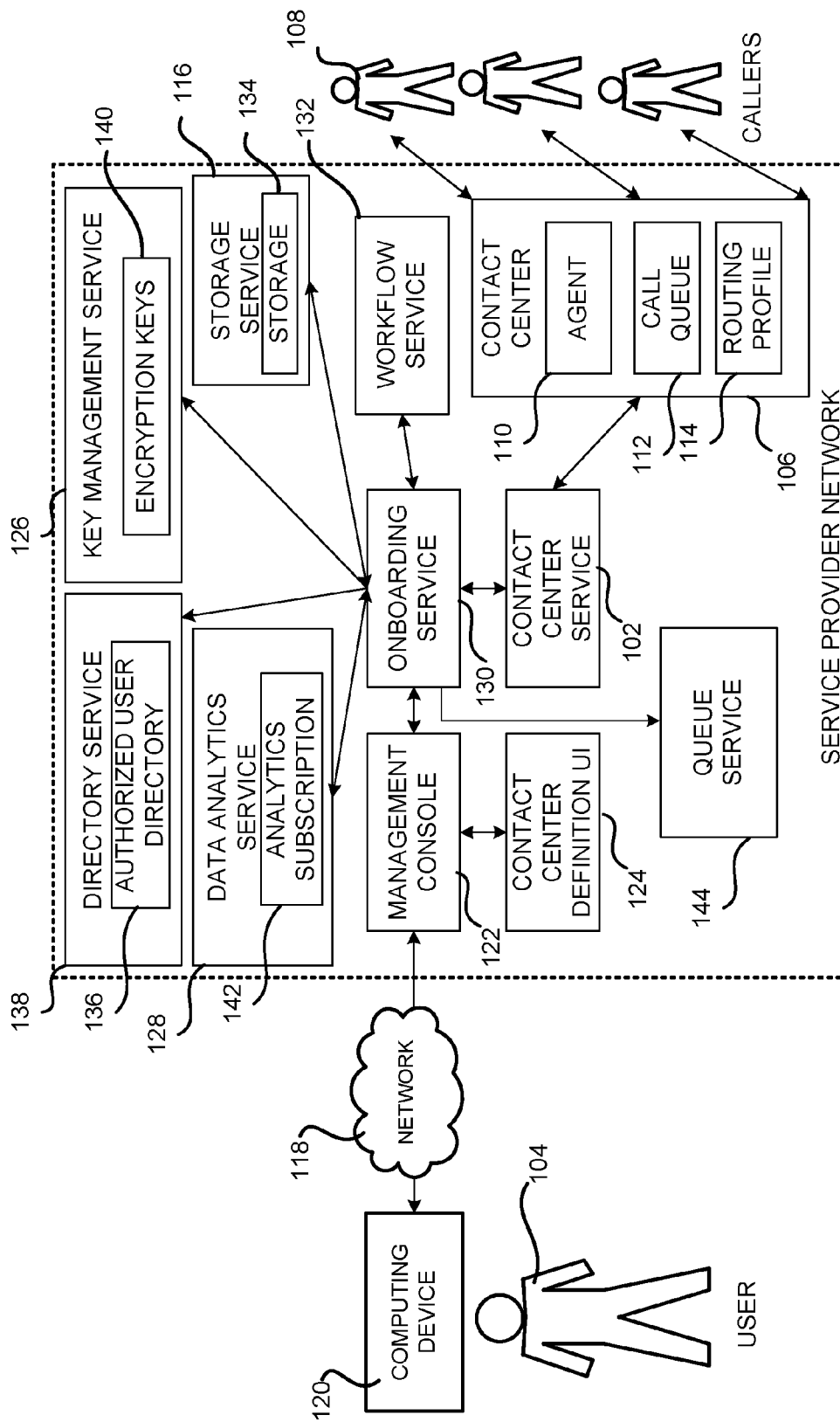
FIG. 1 schematically illustrates a service provider network that provides various services to users including a contact center service and an onboarding service for the contact center service, according to one configuration.

The following detailed description is directed to technologies for providing an onboarding service within a service provider network for creating, on-demand, a contact center at a network-accessible contact center service provided by the service provider network. An implementation of the technologies described herein can improve the speed with which a contact center can be created. The onboarding service can utilize pre-existing information related to an account of the user with the service provider network. In particular, the onboarding service can utilize information from the user's account to initially create a contact center using the contact center service, and can obtain further information from the user to complete the configuration of the contact center. This functionality can reduce processing time and the use of computational resources as compared to previous solutions by quickly creating a contact center on-demand in response to a request from a user. Technical benefits other than those specifically identified herein might also be realized through an implementation of the disclosed technologies.

In accordance with various configurations, a contact center at a network-accessible contact center service can be created and configured within a relatively short period of time. In configurations, the amount of time may be a matter of five to ten minutes. In configurations, a user may access a service provider network. The user may already be a customer of the service provider network and thus have an account with the service provider network. Thus, information about the user and an associated organization may be available at the service provider network. For example, a business or organization name, billing information, address, phone numbers, electronic mail (email), addresses, etc., may already be available within services operating within the service provider network.

Once the user accesses the service provider network, the user may select a user interface (UI) at a management console of the service provider network indicating a desire to create and set up a contact center within the service provider network. In configurations, the contact center may accessible by customers via a phone number. The contact center might also be accessible via other means.

Upon indicating that the user wishes to set up a new contact center, the user may provide information for creating the contact center. For example, in configurations, the user may be prompted as to whether a directory of authorized users for the contact center is already available within the service provider network, and whether the user wishes to use this directory for the new contact center. Alternatively, the user may indicate that the user wishes to manage the user directory for the contact center and thus will import a user directory, manually enter the user directory, etc.

In configurations, the user may also be prompted as to whether or not the user (or their organization) currently has storage services provided by the service provider network. In configurations, the user might also be prompted as to whether or not the user already receives authentication key management services from the service provider network. After providing this information, and potentially other types of information, the user may interact with a UI at the management console that submits the provided information to a contact center on-boarding service at the service provider network.

In configurations, upon providing the information, a job creation service executing in conjunction with the contact center onboarding service may create a job within a workflow service for performing tasks for creating the contact center. The job creation service can gather information about the user and the user's organization from various services operating within the service provider network and populate a template with the obtained information. The information may include, for example, the name of the user's business or organization, an address for the business, a contact phone number for the business, billing information for the business, etc. The gathered information may be used to begin creation of the contact center by associating the gathered information with the contact center.

The job creation service may also autofill the template with the information provided by the user. The job creation service can then submit the template and the created job for creating a contact center to a workflow service. A workflow worker executing in conjunction with the workflow service may then interact with the workflow service to begin performing tasks for creating the contact center. The workflow worker may interact with the workflow service in order to determine the operations that are to be performed next upon completion of another operation.

An activity worker can also interact with the workflow service to begin performing the various activities for creating the contact center. In configurations, the activity worker may create a directory of authorized users based upon the information received from the user. Upon completion of the directory creation, the activity worker may inform the workflow service, which may then interact with the workflow worker via the workflow service in order to determine the next operation.

The workflow worker may then provide the next operation for creating the contact center. In configurations, the next operation may be to create storage locations for various data, including call recordings. The storage locations may be created by the activity worker based upon the information provided by the user. For example, a storage location can be created using a storage service executing within the service provider network.

In configurations, if the user already has storage provided by the service provider network, then some of the existing storage may be allocated for use by the contact center. Alternatively, new storage capabilities may be provided by the storage service operating within the service provider network for the use by the new contact center.

Upon completion of the storage creation, the workflow worker may inform the workflow service as to the next operation. In configurations, the next operation for the activity worker may be to create encryption keys for encoding recordings of customer calls contacting the contact center and call data records (CDRs). The creation of encryption keys can be performed by a service operating within the service provider network, and can be based upon the information provided by the user described above. Thus, the user may already be a user of key management services provided through the service provider network. If not, then such key management services may be activated on behalf of the user for the contact center set up.

In configurations, upon completion of the encryption key creation operation, the workflow worker may inform the workflow service to perform the next operation in creation of the contact center. In embodiments, the next operation for the activity worker may be to instruct a data analytics service executing in the service provider network to create an analytics subscription to be provided by the data analytics service for the contact center for analyzing various data generated by the contact center, and providing performance metrics related to the contact center during use of the contact center. In configurations, this may be an option and the user may decline to receive an analytics subscription. Thus, a prompt may be provided to the user when the user is initially arranging to create a contact center or during creation of the contact center as to whether or not the user desires to utilize a data analytics service.

Upon completion of the analytics subscription creation operation, the next operation in the job flow may be initiated by the workflow worker. The workflow worker may inform the workflow service to create an organization associated with the contact center by storing data defining aspects of the organization. Various operations may be performed in defining an organization which may include, for example, associating an organization with the user directory, creating one or more call queues for queueing incoming calls to the contact center, creating permission groups for the authorized users of the contact center, and creating security profiles for the users within the user directory.

An operation performed in creating the organization might also include specifying an initial user for handling of calls at the new contact center. Generally, the initial user may assigned all powers, abilities and security profiles defined with the contact center. In various configurations, the initial user may be the user that is creating the contact center. In configurations, the initial user may be an electronic or automated agent that may handle calls. Thus, the contact center may be a self-service contact center. Routing profiles may also be created to route calls within the queues to appropriate agents for handling of the calls.

Upon completion of the organization creation operation, a final operation of the workflow may be to activate the contact center. In configurations, the activity worker may finalize the creation of the contact center for the organization by providing a selection of available phone numbers to the user. The user may then select a phone number for use when contacting the new contact center. Upon selection of the phone number by the user, the activity worker may associate the phone number with the contact center and the organization. In configurations, other methods may be used for customers to contact the contact center. For example, the contact center may be configured for contact by customers via an Internet Protocol (IP) address or an application programming interface (API). A unique application (app) based identifier may be provided to allow for app based access to the contact center, rather than by telephone number. Thus, an ingress point for entry into the contact center may be defined in a number of ways, for example through phone calls or by applications, and the described examples herein are not meant to be limiting. For example, calls should not be limited to phone calls.

Thus, the queues and routing profiles described above may be associated with the selected phone number (as well as any other methods of contacting the contact center), and the calls received at the queues may be routed to the initial user, which in one example is the user setting up the contact center. Following this activity, the contact center is ready for use and thus, customers or other users may call the selected phone number to access the contact center.

In configurations, once the contact center is live, metrics dashboards may be viewable by the user to view performance data regarding the contact center. Additionally, a default interactive voice response (IVR) configuration can be provided for calls received at the new contact center. Additionally, once the contact center has been activated, the user may be allowed to create additional queues and associate the additional queues with agents, and to create additional routing profiles to route received calls at the queues to appropriate agents. Additional details regarding the various components and processes described above for creating a contact center within a service provider network will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable electronic devices, minicomputers, mainframe computers, handheld computers, personal digital assistants, e-readers, cellular telephone devices, special-purposed hardware devices, network appliances, and the like. The configurations described herein can also be practiced in distributed computing environments, where tasks can be performed by remote computing devices that are linked through a communications network. In a distributed computing environment, program modules can be located in and executed from both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 schematically illustrates a service provider network 100 that provides various services for users. For example, the service provider network 100 may provide various types of services including, computing services, storage services, etc. In particular, the service provider network 100 may provide a contact center service 102 that allows a user 104 to provide a contact center 106 for customers or potential customers to contact the user 104 or a business or organization of the user 102.

As discussed briefly above, contact centers 106 may allow for customers to contact businesses and organizations, generally via telephone calls, but other methods may be used for customers to contact the contact center 106. For example, the contact center 106 may be configured for contact by customers via an Internet Protocol (IP) address or an application programming interface (API). A unique application (app) based identifier may be provided to allow for app based access to the contact center 106, rather than by telephone number. Thus, an ingress point for entry into the contact center 106 may be defined in a number of ways, for example through phone calls or by applications, and the described examples herein are not meant to be limiting. For example, calls should not be limited to phone calls.

Calls come into the contact center from customers from callers 108 and, if an appropriate agent 110 is not available to handle the call, the call may be routed to a call queue 112. One or more agents 110 may be associated with specific call queues 112 and thus, calls may be routed from the call queues 112 to an appropriate agent 110 based upon a routing profile 114 defined at the contact center 106. Calls between the caller 108 and an agent 110 may be recorded, as well as other data related to incoming calls, and therefore data storage is generally required for the contact center 106 and may be provided by a storage service 116. Details regarding the operation of the storage service 116 will be provided below. In configurations, calls may not be recorded and thus, the storage service 116 may not be needed. However, the user 104 may wish to store data and metrics related to calls and thus, may still use the storage service 116. In configurations, data and other metrics related to calls may be stored by an operator of the service provider network 100, in addition to or instead of the user 104, for a variety of purposes including billing purposes.

In order for the user 104 to create a contact center 106 at the contact center service 102, the user 104 accesses the service provider network 100 over a network 118, e.g., the Internet, using a computing device 120. Upon accessing the service provider network 100 by the user 104, if the user 104 is a customer of the service provider network 100, then the user 104 may log into their account via a management console 122. If the user 104 is not a customer of the service provider network 100, the user 104 can set up an account with the service provider network 100 via the management console 122.

The user 104 can then interact with a contact center definition UI 124 at the management console 122 to indicate the user's desire to create a contact center 106 at the contact center service 102. In configurations, the user 104 may then be prompted as to whether a directory 136 of authorized users for the contact center 106 is already available within the service provider network 100, and whether the user 104 wishes to use this directory 126 for the new contact center 106. Alternatively, the user 104 may indicate that the user 104 wishes to manage the user directory for the contact center 106 and thus will import a user directory, manually enter the user directory, etc.

In configurations, the user 104 may also be prompted as to whether or not the user 104 currently has storage via storage service 116 provided by the service provider network 100. In configurations, the user 104 might also be prompted as to whether or not the user 104 already receives key management services from a key management service 126 operating in the service provider network 100. Additionally, the user 104 may be prompted as to whether the user 104 desires to receive data analytics related to the call center 106 via a data analytics service 128. After providing this information, and potentially other types of information, the user 104 may interact with the contact center definition UI 124 at the management console 122 to submit the requested information to an onboarding service 130 executing within the service provider network 100.

As will be discussed further herein, based upon information from the service provider network account of the user 104 and the information gathered from the user 104 via the management console 122, the onboarding service 130 can create a contact center 106 for the user 104 at the contact center service 102. In creating the contact center 106, the onboarding service 130 can interact with a workflow service 132 to provide one or more of storage 134 for the contact center 106 at the storage service 116, an authorized user directory 136 for the contact center 106 at a directory service 138, encryption keys 140 at the key management service 126, an analytics subscription 142 at the data analytics service 128 and one or more call queues 112 provided by the queue service 144. Additional details regarding these processes will be provided below with regard to FIGS. 2-4B.

Figure 2:
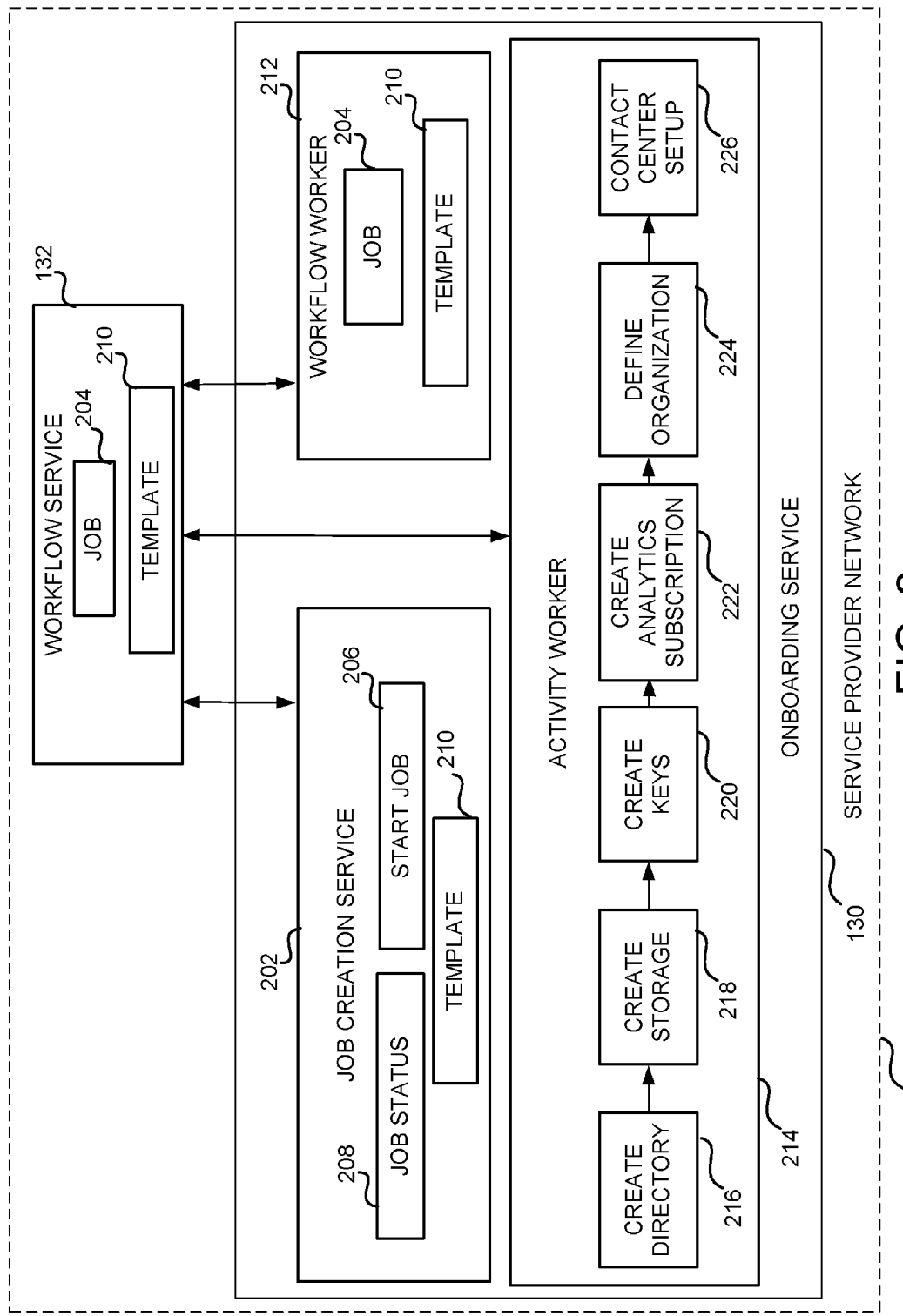
FIG. 2 schematically illustrates aspects of the configuration and operation of the onboarding service for the contact center service operating within the service provider network of FIG. 1, according to one configuration.

FIG. 2 schematically illustrates aspects of the configuration and operation of the onboarding service 130 within the service provider network 100. As shown in FIG. 2, the contact center onboarding service 130 may include a job creation service 202. The job creation service 202 may be utilized to create a job 204 for creating a contact center 106 for a user 104. The job creation service 202 may include a start job function 206 and a job status function 208. The start job function 206 may start a job 204 when the job 204 is created and the job status function 208 may monitor performance of the job 204 once the job 204 has started.

In configurations, the job creation service 202 may be activated to create a job 204 for creating a contact center 106 for a user 104 once the user 104 completes interaction with the contact center definition UI 124 of the management console 122 as previously described. In configurations, the job creation service 202 may auto-configure a template 210 with initial information related to the user 104 from the user's service provider network account that may include, for example, the name of the user's business or organization, an address for the business, billing information for the business, a phone number for the business, an email for the business, etc., for use in initially setting up the contact center 106. The job creation service 104 may also auto-configure the template 210 with the information submitted by the user 104 when the user requested creation of the contact center 106 via the contact center definition UI 124 of the management console 122.

The workflow service 132 can coordinate performance of jobs 204 created by the job creation service 202. A workflow worker 212 is also provided within the onboarding service 130 that may interact with the workflow service 132 to provide the next operations in creating the contact center 106. An activity worker 214 may be provided for performing the various activities or operations of the created job 204 for creating the contact center 106. Thus, in configurations, the activity worker 214 may include a create directory activity 216, a create storage activity 218, a create keys activity 220, a create analytics subscription activity 222, a define organization activity 224, and a contact center set-up activity 226.

In configurations, once the job creation service 202 has created a job 204, the job creation service 202 may start the job 204 via the start job function 206. The job 204 may then be provided, along with the auto-configured template 210, to the workflow service 132. The workflow worker 132 also receives the created job 204 from the job creation service 202 and interacts with the workflow service 132 to provide next activities for the created job 204. The auto-configured template 210 may be associated with the created job 204, and both may be associated with the onboarding service 130.

The workflow worker 132 may initiate performance of the created job 204 with the workflow service 132 by instructing the workflow service 132 to perform a first activity within the created job 204. In configurations, the first activity may be to create the authorized user directory 136 of the contact center 106. Thus, the activity worker 214 may expose a create directory application programming interface (API) to thereby perform the create directory activity 216.

The create directory activity 216 may create the authorized user directory 136 using the directory service 138 operating within the service provider network 100 based upon the information contained within the template 210. Thus, the authorized user directory 136 may be created based upon a directory already included within the service provider network 100 or may be manually provided or imported by the user 104 based upon the template 210. The authorized user directory 136 may be manually provided or imported at the time of creation or after creation of the contact center 106. If the authorized user directory 136 is to be provided after creation of the contact center 106, a default authorized user directory 136 may be created that includes only the user 104 creating the contact center 106.

Upon completion of the create directory activity 216, the activity worker 214 may provide an indication to the workflow service 132, which may indicate to the workflow worker 212 that the create directory activity 216 has been completed. The workflow worker 212 may then determine the next operation in creating the contact center 106. In configurations, the next activity in creating the contact center 106 may be the create storage activity 218 for various data and call recordings of the contact center 106. In configurations, the call recordings may be voice messages left by callers 108 contacting the contact center 106 or may be call recordings of calls between agents 110 of the contact center 106 and callers 108 who contact the contact center 106.

Once the workflow worker 212 instructs the workflow service 132 as to the next activity, which in this example is the create storage activity 218, the activity worker 214 may call a create storage API for the create storage activity 218. Based upon the information within the template 210, the storage 134 for the contact center 106 may be created by the create storage activity 218. The storage 134 may be storage already provided at one or more storage locations within the storage service 116 executing within the service provider network 100 to the user 104 or may be new storage provided at one or more storage locations within the storage service 116 executing within the service provider network 100 for use by the contact center 106.

If the user already has storage provided by the storage service 116, data identifying the one or more storage locations provided by the storage service 116 may be utilized create the storage 134. In configurations, even if the user 104 already has storage provided at one or more storage locations within the storage service 116 executing within the service provider network 100, additional storage 134 may be created at one or more storage locations within the storage service 116 for the contact center 106 as needed or desired. As previously noted, in configurations, the storage service 116 may not be needed or desired.

Upon completion of the create storage activity 218, the activity worker 214 informs the workflow service 132, which in turn informs the workflow worker 212. The workflow worker 212 then determines the next activity within the created job 204 and informs the workflow service 132 accordingly, which causes the activity worker 214 to expose an API for the next activity.

In configurations, the next activity may be the create keys activity 220 for the creation of encryption keys 140 for encrypting data, CDRs, call recordings and/or caller phone numbers stored within the storage 134. The encryption keys 140, based upon the information provided within the template 210, may be created as part of an existing key management service 126 subscription of the user 104. Alternatively, the creation of the encryption keys 140 may performed as a new service by the key management service 126. In configurations, encryption keys 140 may not be needed or desired. For example, if the user 104 is not going to store any calls or data, then encryption keys 140 may not be needed.

Once the encryption keys 140 have been created, the workflow worker 212 may be informed and may determine the next activity within the created job 204. The workflow worker 212 may inform the workflow service 132 accordingly as to the next activity. The workflow service 132 may then inform the activity worker 214 to perform the next activity for creating the contact center 106. In configurations, the next activity may be to create the analytics subscription 142 for generating and delivering data analytics by the data analytics service 128 for the contact center 106, if the user has indicated that such data analytics are desired. The activity worker 214 may thus expose an API for the create analytics subscription activity 222 for creating the analytics subscription 142 with the data analytics service 128.

Upon completion of this activity, or if this activity is not necessary, the workflow worker 212 may determine the next activity for performance in creating the contact center 106 and inform the workflow service 132 accordingly. In configurations, the next activity may be to define aspects of an organization for the contact center 106. Thus, the activity worker 214 may expose an API for the define organization activity 224. In configurations, the define organization activity 224 may include multiple activities for defining aspects of the organization.

Figure 3:
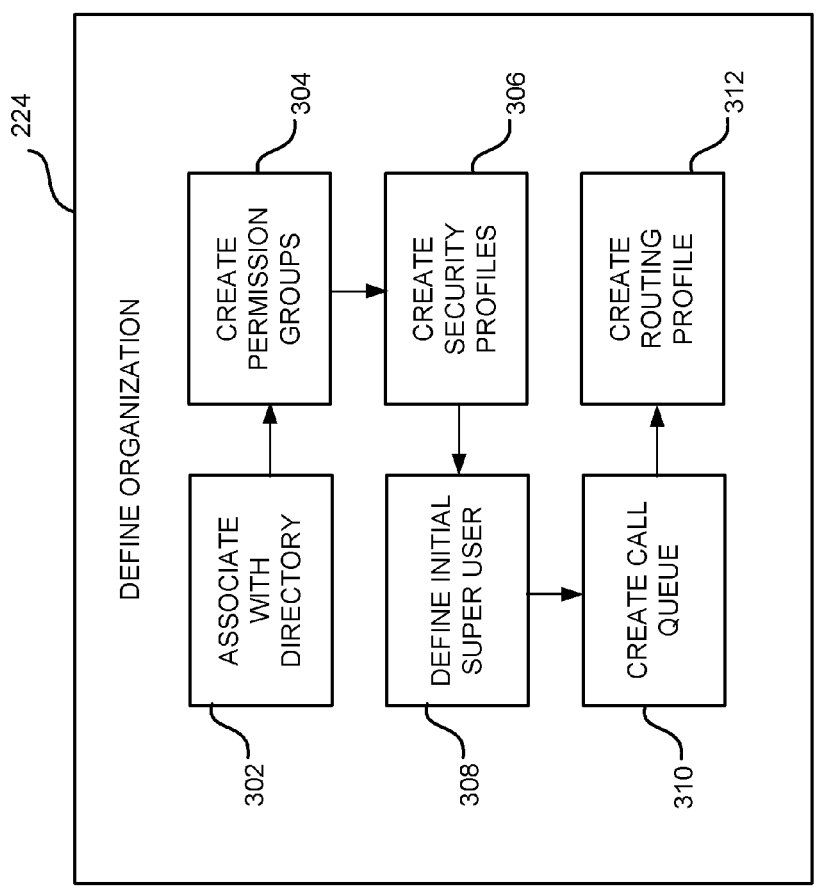
FIG. 3 schematically illustrates activities that may be performed by a create organization activity within the contact center onboarding service of FIG. 2, according to one configuration.

FIG. 3 schematically illustrates activities that may be performed by the define organization activity 224 within the onboarding service 130. The define organization activity 224, in configurations, may include an activity 302 for associating the organization with the created authorized user directory 136.

In configurations, the define organization activity 224 may also include a create permission groups activity 304. The permission groups may be defined based upon the created authorized user directory 136 and may assign various permissions to the different authorized users with regard to the contact center 106. For example, certain users may only be allowed to receive calls, one or more users may be allowed to change parameters within the contact center 106, etc.

The define organization activity 224 may also include a create security profiles activity 306. The create security profiles activity 306 may include defining a contact center administrator. The contact center administrator generally has the broadest access to the contact center 106. In configurations, the default contact center administrator may be the user 104 creating the contact center 106.

The create security profiles 306 may also define a contact center manager, a contact center quality analyst and one or more contact center agents. The contact center manager generally may have permissions within the permission groups to manipulate call queues 112 and contact center agents 110. The contact center quality analyst may be provided with performance metrics and data related to the contact center 106 from the data analytics service 128 based upon the analytics subscription 142. The contact center agents 110 may generally be associated with call queues 112 and may have calls from their associated call queues 112 routed to them based upon a routing profile 114. Initially, the default person for the contact center manager, contact center quality analyst and contact center agent may be the user 104 creating the contact center 106.

In configurations, the define organization activity 224 may include a define initial user activity 308. The initial user may be an agent 110 to which calls within a call queue 112 may be routed, at least initially. In configurations, the initial user may be the user 104 creating the contact center 106. The initial user is generally a "super administrator" that may at least initially be included in all of the permission groups and may include all of the security profiles. In configurations, the define initial user activity 308 may allow for the definition of multiple agents 110 that may be associated with multiple call queues 112. Routing profiles 114 and permission profiles may be configured accordingly.

The define organization activity 224 may also include a create call queue activity 310. The create call queue activity 310 may create one or more call queues 112 for queueing incoming calls to the contact center 106. The call queues 112 may be created for different functions and agents 110. For example, one call queue 112 may be created for an agent 110 that handles calls related to retail issues. Another call queue 112 may be created for queuing calls related to delivery issues. In configurations, only a single call queue 112 may be initially created by the create call queue activity 310 in order to get the contact center 106 set up and active. The user 104 may then create additional call queues 112 once the contact center 106 is set up and active.

In configurations, the define organization activity 224 may include a create routing profile activity 312. The create routing profile activity 312 may generally create routing profiles 114 for the created call queues 112 and any agents 110 associated with the call queues 112. Thus, the routing profiles 114 can route received calls from the call queues 112 to the appropriate agent or agents 110. Thus, if multiple call queues 112 are created, the user may be prompted to associate call queues 112 with agents 110 for various purposes. For example, the first call queue 112 may be associated with retail issues while a second call queue 112 may be associated with delivery issues.

Thus, when a caller 108 calls into the contact center 106, the contact center 106 may be configured such that the caller 108 may be prompted as to what the reason is for contacting the contact center 106 and can thus be routed to the appropriate call queue 112. Initially, a single call queue 112 may be created and associated with the initial user as an agent 110. Thus, a single routing profile 114 may be initially created to route calls from the single call queue 112 to the initial user. This may allow for quicker initial setup of the contact center 106.

In configurations, when multiple call queues 112 are created, the call queues 112 may be prioritized. Thus, call queues 112 with lower priorities may generally have their calls routed to agents 110 as call queues 112 with higher priorities are emptied. Accordingly, routing profiles 114 may be created by the create routing profile activity 312 that allow for agents 110 to be associated with multiple call queues 112.

Returning to FIG. 2, once the define organization activity 224 has been completed, the workflow service 132 may inform the workflow worker 212 accordingly. The workflow worker 212 may then determine the next activity of the job 204 and inform the workflow service 132 accordingly. The workflow service 132 may then inform the activity worker 214, which may expose an API for the contact center setup activity 226, which may be the final activity in setting up the contact center 106. The contact center setup activity 226 may provide multiple pre-provisioned phone numbers to the user 104. The user 104 may select a telephone number from the pre-provisioned phone numbers. The contact center setup activity 226 may then activate the selected phone number.

In particular, the onboarding service 130, or some other service within the service provider network 100, includes a plurality, e.g., 3,000-4,000, of pre-provisioned phone numbers from one or more telephone service providers. The service provider network 100 includes one or more session border controllers (SBCs) to which the telephone service providers may connect to provide service. As is known, a SBC is a device regularly deployed in Voice over Internet Protocol (VoIP) networks to exert control over the signaling and usually also the media streams involved in setting up, conducting, and tearing down telephone calls or other interactive media communications.

Upon receipt of the pre-provisioned phone numbers from the telephone service providers, the pre-provisioned phone numbers are configured to interact with a SBC, which means the phone numbers are ready for use. Once the user 104 selects a phone number, the phone number is associated with the user 104 and/or the contact center 106 of the user 104, and is then ready for use, i.e. activated for use via the SBC to receive calls at the contact center 106. The phone number may also be configured for placing outgoing telephone calls if desired. As pre-provisioned phone numbers are selected, more pre-provisioned phone numbers may be obtained from telephone service providers.

Upon activation of the phone number, the contact center setup activity 226 may associate the phone number with created call queues 112 and routing profiles 114, as well as the initial user. Initially, as previously noted, the initial user may be the user 104 creating the contact center 106. An initial voice recording (IVR) may be provided by the contact center setup activity 226 as a default for callers calling into the contact center 106. Thus, upon completion of the contact center setup activity 226, the contact center 106 is activated and the user 104 may call the selected phone number, which rings into the created contact center 106. When the user 104 calls into the contact center 106, the contact center 106 answers the call and the user 104 may hear the IVR provided as a default.

It is to be appreciated that the examples given above are merely illustrative and that other techniques can be used in other configurations. Additional details regarding the arrangements shown in FIGS. 1-3 will be provided below with respect to FIGS. 4A and 4B.

Figure 4A:
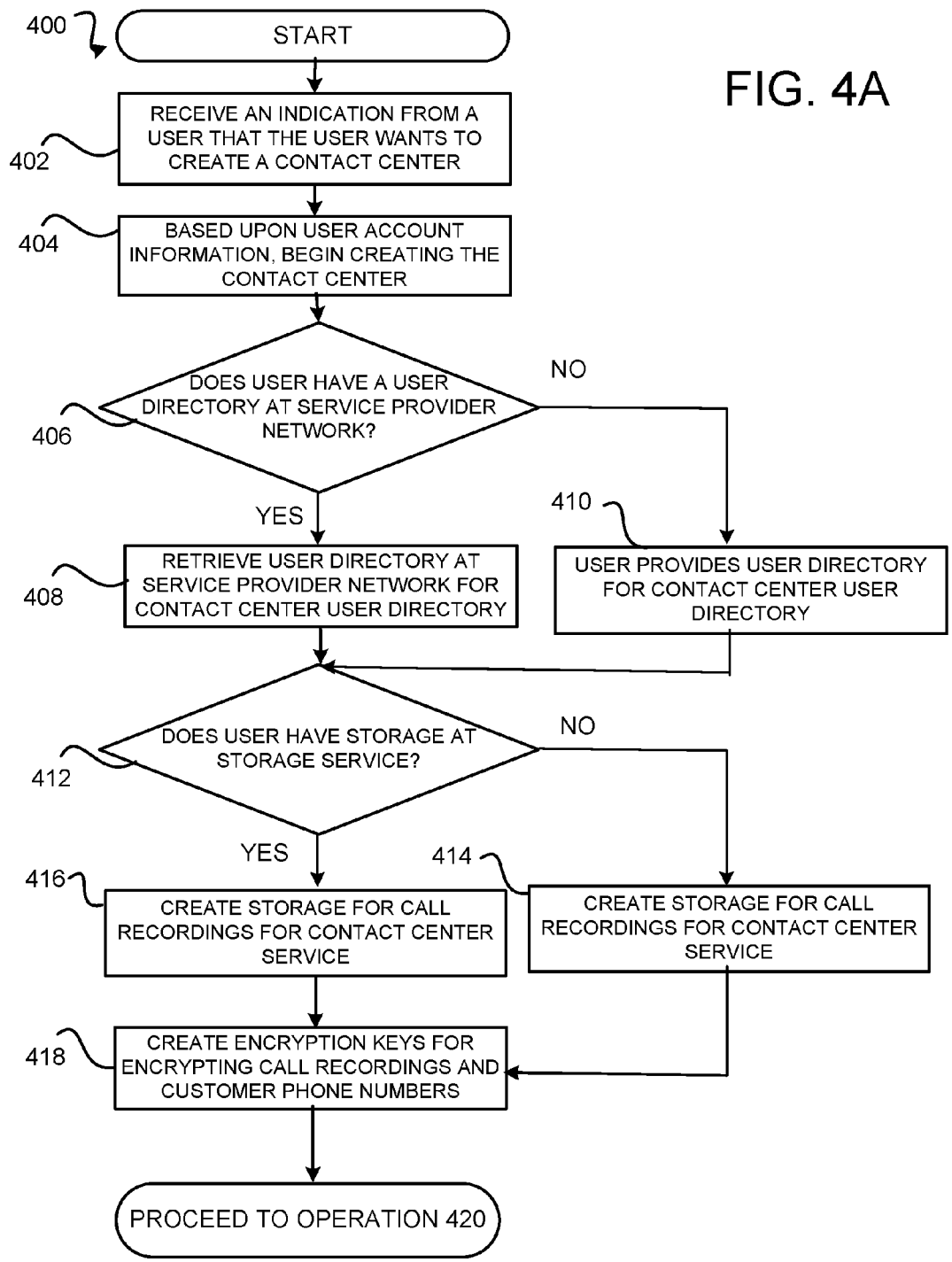
FIGS. 4A and 4B are a flow diagram showing a routine that illustrates aspects of operations performed by the contact center onboarding service of the service provider network arrangements of FIGS. 1-3 in order to create a new contact center on-demand, according to one configuration.
Figure 4B:
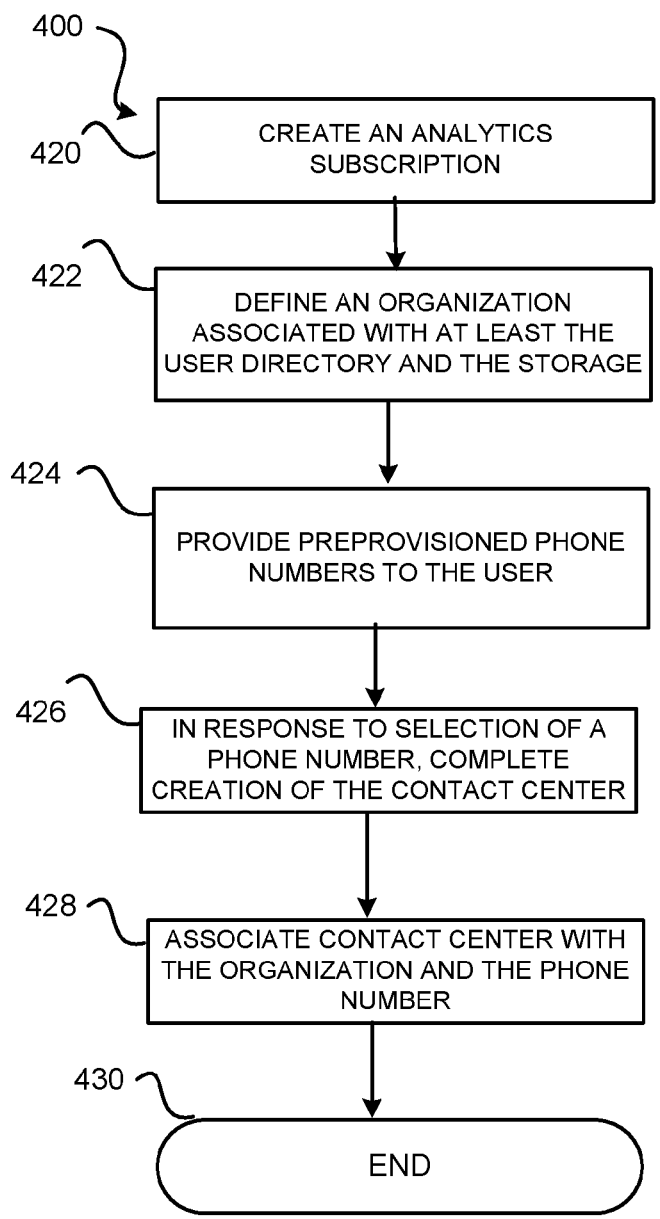

FIGS. 4A and 4B include flow diagrams showing a routine 400 that illustrates aspects of creating a contact center 106 at a contact center service, e.g. the contact center service 102 of the service provider network 100 of FIGS. 1 and 2. It is to be appreciated that the logical operations described herein with respect to FIGS. 4A and 4B (and the other FIGS.) can be implemented as a sequence of computer implemented acts or program modules running on a computing system and/or as interconnected machine logic circuits or circuit modules within the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

Referring to FIG. 4A, the routine 400 begins at operation 402, where an indication is received from a user, e.g., user 104, to create a contact center, e.g., contact center 106, at a service provider network, e.g., service provider network 100 The indication can be in response to the user interacting with the contact center definition UI 124 at the management console 122. At operation 404, based upon information associated with an account of the user at the service provider network, an onboarding service, e.g., onboarding service 130, begins creation of the contact center within the service provider network.

From operation 404, the routine 400 continues to operation 406, where it is determined if the user has a user directory stored on the service provider network. If so, then the routine 400A proceeds to operation 408, where the user directory is retrieved and used to create a user directory, e.g., authorized user directory 136, for the contact center. If no, then at operation 410 the user provides the user directory. At operation 412, it is determined if the user currently has storage on a storage service, e.g., storage service 116, operating within the service provider network. If so, then at operation 414 storage is created from the existing storage for at least customer call recordings. In configurations, additional storage for the contact center may also be created if needed or desired. If the user does not currently have storage at the storage service 116, then at operation 416, storage is created at the storage service for at least customer call recordings.

From operations 414 and 416, the routine 400 proceeds to operation 418, where encryption keys are created for encrypting customer call recordings and customer phone numbers in the storage. The encryption keys may be created by, for example, key management service 126. From operation 418, the routine 400 proceeds to operation 420 shown in FIG. 4B.

At operation 420, an analytics subscription, e.g., analytics subscription 142 may be created. The analytics subscription may provide analytics related to the contact center by the data analytics service 128. At operation 422, aspects of an organization that is associated with the user directory and the storage may be defined.

From operation 422, the routine 400 proceeds to operation 424, where, in embodiments that a phone number may be accessed in order to access the contact center, pre-provisioned phone numbers are provided to the user for selection of a phone number for the contact center. As previously noted, other methods may be used for customers to contact the contact center 106. For example, the contact center 106 may be configured for contact by customers via an Internet Protocol (IP) address or an application programming interface (API). A unique application (app) based identifier may be provided to allow for app based access to the contact center 106, rather than by telephone number. Thus, an ingress point for entry into the contact center 106 may be defined in a number of ways, for example through phone calls or by applications, and the described examples herein are not meant to be limiting. For example, calls should not be limited to phone calls.

From operation 424, the routine 400 proceeds to operation 426, where in response to selection of a phone number, the contact center is completed. At operation 428, the contact center is associated with the organization and the phone number (or other contact identifier). From operation 428, the routine 400 proceeds to operation 430, where it ends.

Figure 5:
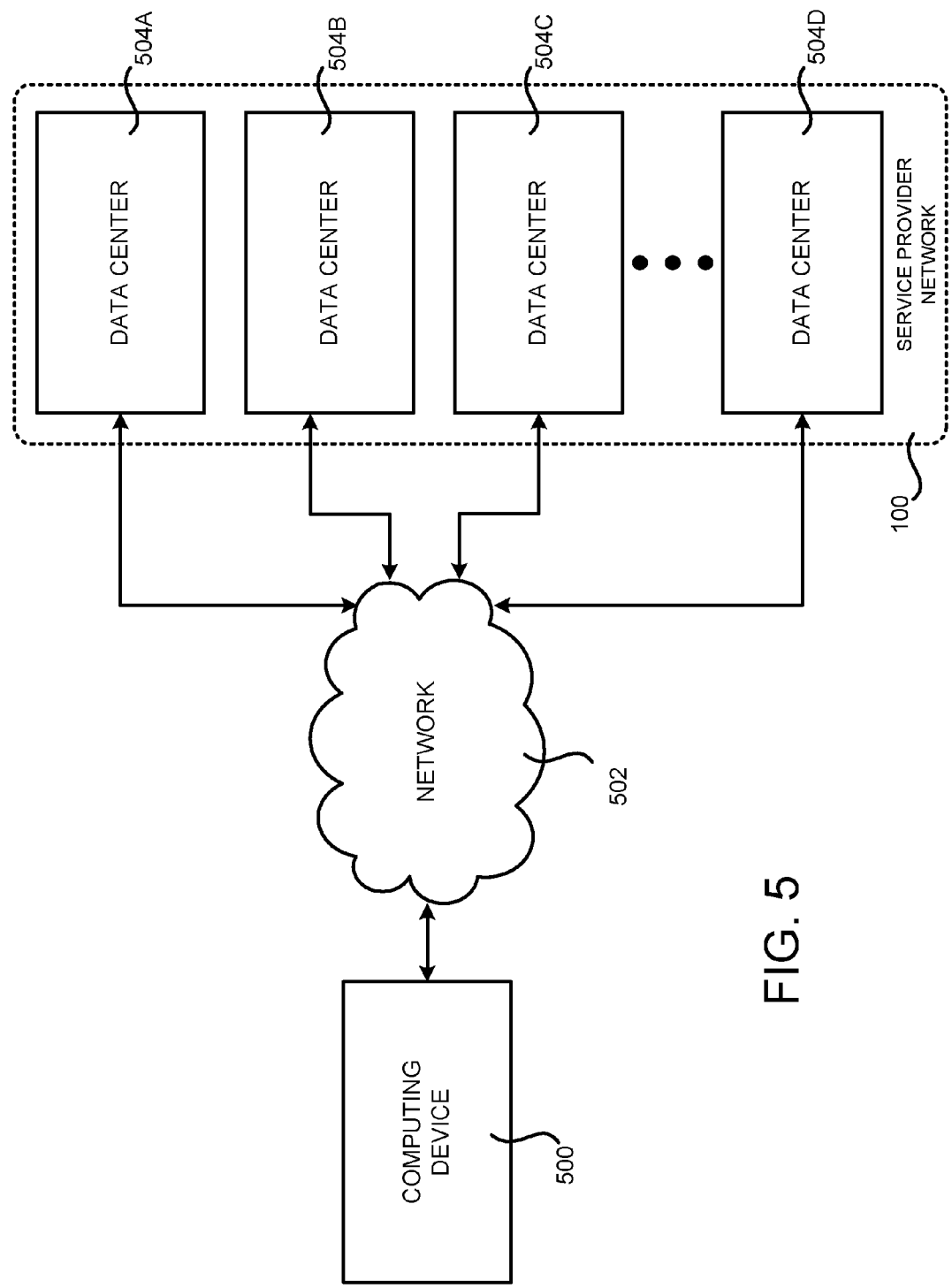
FIG. 5 is a system and network diagram that shows an illustrative operating environment that includes a service provider network that can be configured to implement aspects of the functionality described herein.

FIG. 5 is a system and network diagram that shows one illustrative operating environment for the configurations disclosed herein that includes a service provider network 100. As discussed above, the service provider network 100 can execute network services that provide computing resources on a permanent or an as-needed basis. Among other types of functionality, the computing resources provided by the service provider network 100 can be utilized to implement the various network services described herein. As also discussed above, the computing resources provided by the service provider network 100 can include various types of computing resources, such as data processing resources like VM instances, stateless event-driven compute services, data storage resources, networking resources, data communication resources, network services, and the like.

Each type of computing resource provided by the service provider network 100 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

As also discussed above, the computing resources provided by the service provider network 100 are enabled in one implementation by one or more data centers 504A-504D (which might be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that can be utilized to implement the technologies disclosed herein will be described below with regard to FIG. 6.

The customers and other users of the service provider network 100 can access the computing resources provided by the service provider network 100 over a network 502, which can be a wide area communication network ("WAN"), such as the Internet, an intranet or an Internet service provider ("ISP") network or a combination of such networks. For example, and without limitation, a computing device 500 operated by a customer or other user of the service provider network 100 can be utilized to access the service provider network 100 by way of the network 502. It should be appreciated that a local-area network ("LAN"), the Internet, or any other networking topology known in the art that connects the data centers 504 to remote customers and other users can be utilized. It should also be appreciated that combinations of such networks can also be utilized.

Figure 6:
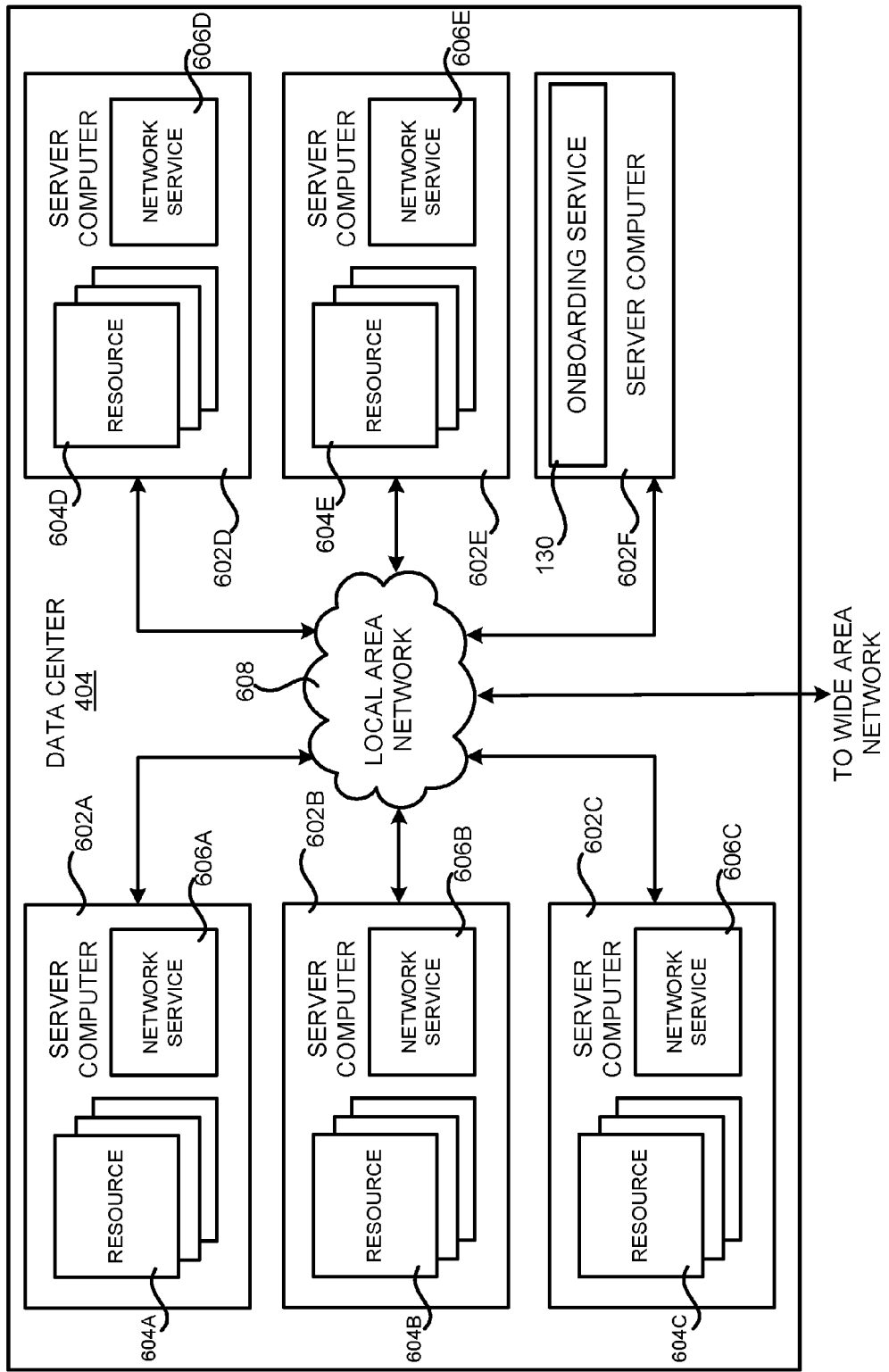
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein. The example data center 504 shown in FIG. 6 includes several server computers 602A-602F (which might be referred to herein singularly as "a server computer 602" or in the plural as "the server computers 602") for providing the computing resources 604A-604E.

The server computers 602 can be standard tower, rackmount, or blade server computers configured appropriately for providing the computing resources 604 described herein (illustrated in FIG. 6 as the computing resources 604A-604E). As mentioned above, the computing resources 604 provided by the service provider network 100 can be data processing resources such as VM instances or hardware computing systems, data storage resources, database resources, networking resources, and others. Some of the servers 602 can also be configured to execute network services 606A-606E, respectively, capable of instantiating, providing and/or managing the computing resources 604, some of which are described in detail below with regard to FIG. 7.

The data center 504 shown in FIG. 6 also includes a server computer 602F that can execute some or all of the software components described above. For example, and without limitation, the server computer 602F can be configured to execute the onboarding service 130, which was described in detail above. The server computer 602F can also be configured to execute other components and/or to store data for providing some or all of the functionality described herein. In this regard, it should be appreciated that the can execute on many other physical or virtual servers in the data centers 504 in various configurations.

In the example data center 504 shown in FIG. 6, an appropriate LAN 608 is also utilized to interconnect the server computers 602A-602F. The LAN 608 is also connected to the network 502 illustrated in FIG. 5. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 504A-504D, between each of the server computers 602A-602F in each data center 504, and, potentially, between computing resources 604 in each of the data centers 504. It should be appreciated that the configuration of the data center 404 described with reference to FIG. 6 is merely illustrative and that other implementations can be utilized.

Figure 7:
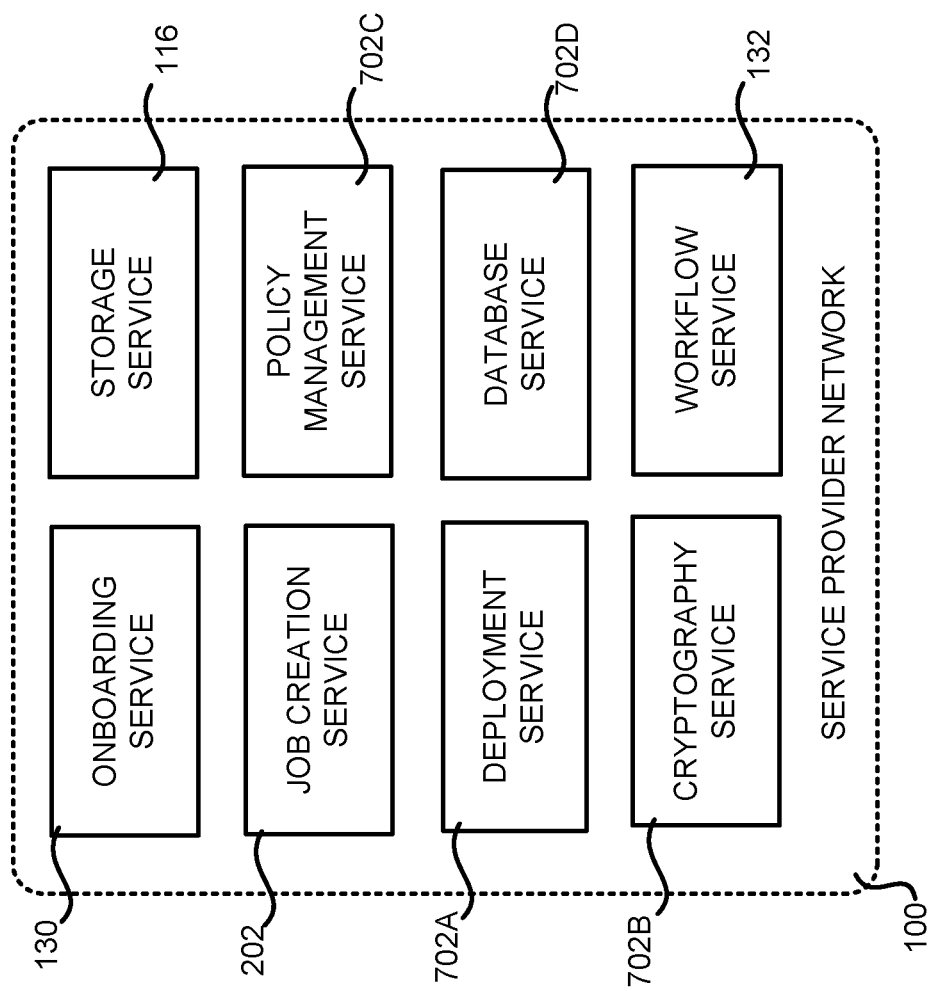
FIG. 7 is a network services diagram that shows aspects of several services that can be provided by and utilized within a service provider network configured to implement the various technologies disclosed herein.

FIG. 7 is a system and network diagram that shows aspects of several network services that can be provided by and utilized within the service provider network 100 in one configuration disclosed herein. In particular, and as discussed above, the service provider network 100 can provide a variety of network services to customers and other users of the service provider network 100 including, but not limited to, the onboarding service 130, the job creation service 202, the storage service 116, and the workflow service 132. The service provider network 100 can also provide other types of services including, but not limited to, a deployment service 702A, a cryptography service 702B, and/or a policy management service 702c, each of which is described in greater detail below. Additionally, the service provider network 100 can also provide other types of network services, some of which are also described in greater detail below.

It should be appreciated that customers of the service provider network 100 can include organizations or individuals that utilize some or all of the services provided by the service provider network 100. As described above, a customer or other user can communicate with the service provider network 100 through a network, such as the network 502 shown in FIG. 5. Communications from a customer computing device to the service provider network 100 can cause the services provided by the service provider network 100 to operate in accordance with the described configurations or variations thereof.

It is noted that not all configurations described include the services described with reference to FIG. 5 and that additional network services can be provided in addition to or as an alternative to the services explicitly described herein. Each of the services shown in FIG. 5 can also expose network service interfaces that enable a caller to submit appropriately configured application programming interface ("API") calls to the various services through network service requests. In addition, each of the services can include service interfaces that enable the services to access each other.

The service provider network 100 can also include a cryptography service 702B. The cryptography service 702B can utilize storage services of the service provider network 100 to store encryption keys in encrypted form, whereby the keys can be usable to decrypt customer keys accessible only to particular devices of the cryptography service 702B. The cryptography service 702B can also provide other types of functionality not specifically mentioned herein.

As illustrated in FIG. 7, the service provider network 100, in various configurations, a policy management service 702c. The policy management service 702C, in one example, is a network service configured to manage policies on behalf of customers or internal users of the service provider network 100. The policy management service 702C can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services based, at least in part, on the needs of its customers. For instance, the service provider network 100 can maintain a deployment service 702A for deploying program code and/or a database service 702D in some configurations. The database service 702D can be a collection of computing resources that collectively operate to create, maintain, and allow queries to be performed on databases stored within the service provider network 100. For example, a customer or other user of the service provider network 100 can operate and manage a database from the database service 702E by utilizing appropriately configured network API calls. This, in turn, can allow the customer to maintain and potentially scale the operations in the database. Other services include object-level archival data storage services, and services that manage, monitor, interact with, or support other services. The service provider network 100 can also be configured with other network services not specifically mentioned herein in other configurations.

Figure 8:
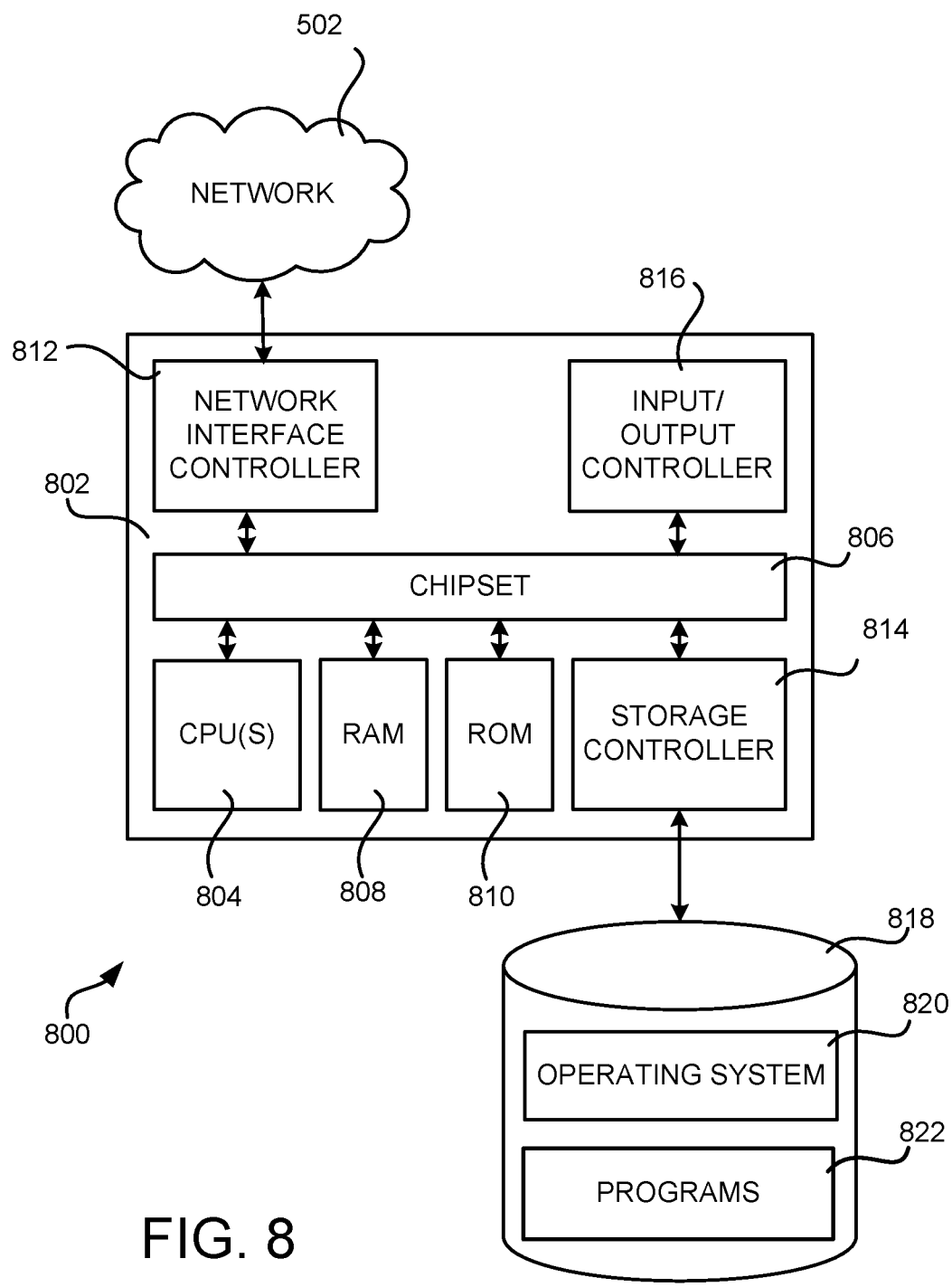
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 502 shown in FIG. 5. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above with regard to FIGS. 1-4. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or another type of output device. It will be appreciated that the computer 800 might not include all of the components shown in FIG. 8, can include other components that are not explicitly shown in FIG. 8, or might utilize an architecture completely different than that shown in FIG. 8.

Based on the foregoing, it should be appreciated that technologies for creating a contact center at a contact center service operating within a service provider network utilizing an onboarding service operating within the service provider network have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method comprising:
receiving an indication from a computing device associated with a user to create a contact center on a service provider network;
initiating creation of the contact center within the service provider network based at least in part upon information associated with an account of the user at the service provider network, wherein initiating creation of the contact center comprises:
gathering, by a contact center onboarding service of the service provider network, the information associated with the account of the user at the service provider network; and
populating, by the contact center onboarding service of the service provider network, a template with the gathered information for use in creating the contact center;
receiving directory information relating to an authorized user directory, wherein the authorized user directory includes one or more authorized users for the contact center; and
receiving storage information relating to storage on the service provider network for storing at least call recordings for the contact center;
in response to receiving the directory information and the storage information:
creating the authorized user directory for the contact center;
creating storage for at least call recordings at a storage service operating within the service provider network; and
defining an organization such that the organization is associated with at least the user, the authorized user directory and the storage, including creating at least one call queue for queuing received customer calls and creating a routing profile associated with the call queue that routes calls from the call queue to an initial user;
providing a plurality of phone numbers to the user for selection of a phone number for the contact center;
receiving a selection of a phone number for the contact center; and
associating the organization and the phone number with the contact center to complete creation of the contact center.

2. The computer-implemented method of claim 1, wherein receiving directory information relating to the authorized user directory comprises one of (i) receiving information relating to a user directory currently stored on the service provider network or (ii) receiving information relating to creation of the authorized user directory by the user.

3. The computer-implemented method of claim 1, wherein receiving storage information relating to storage on the service provider network comprises receiving data identifying a storage location provided by the storage service operating within the service provider network.

4. The computer-implemented method of claim 3, wherein creating storage for at least customer call recordings comprises creating an additional storage location within the storage service on the service provider network that is associated with current storage of the user.

5. The computer-implemented method of claim 1, further comprising creating an analytics subscription to provide analytics from a data analytics service operating within the service provider network related to at least call detail records of received calls at the contact center.

6. The computer-implemented method of claim 1, further comprising:
creating encryption keys, using a key management service operating within the service provider network, for encrypting call recordings and phone numbers in the storage.

7. A system, comprising:
one or more servers hosting a contact center onboarding service within a service provider network, wherein the contact center onboarding service is configured to:
initiate creation of a contact center within the service provider network based at least in part upon information associated with an account of a user at the service provider network, wherein initiation of creation of the contact center comprises populating a template with the information associated with the account of the user at the service provider network for use in creating the contact center;
create an authorized user directory of authorized users, wherein the authorized user directory includes one or more authorized users for the contact center;
define aspects of an organization associated with at least the user and the authorized user directory, wherein defining aspects of the organization comprises creating at least one call queue for queuing received customer calls and creating a routing profile associated with the call queue that routes calls from the call queue to an initial user;
provide a plurality of phone numbers to the user for selection of a phone number for the contact center; and
following selection of a phone number, associate the organization and the phone number with the contact center to complete creation of the contact center.

8. The system of claim 7, wherein the contact center onboarding service is further configured to receive directory information relating to the authorized user directory based at least in part upon one or more of (i) receiving information relating to a user directory currently stored on the service provider network or (ii) receiving information relating to creation of the authorized user directory by the user.

9. The system of claim 7, wherein the contact center onboarding service is further configured to:
receive data identifying a storage location provided by a storage service operating within the service provider network; and
create encryption keys, using a key management service operating within the service provider network, for encrypting customer call recordings and customer phone numbers in the storage service.

10. The system of claim 9, wherein the contact center onboarding service is further configured to create an additional storage location within the storage service for at least customer call recordings on the service provider network that is associated with current storage of the user.

11. The system of claim 7, wherein the contact center onboarding service is further configured to create an analytics subscription to provide analytics from a data analytics service operating within the service provider network to the user related to at least call detail records of received customer calls at the contact center.

12. The system of claim 7, wherein the contact center onboarding service is further configured to define aspects of the organization associated with at least the user directory and the storage by:
defining the user as the initial user.

13. The system of claim 12, wherein the contact center onboarding service is further configured to create security profiles for the initial user.

14. The system of claim 13, wherein the contact center onboarding service is further configured to create security profiles corresponding to (i) a contact center administrator, (ii) a contact center manager, (iii) a contact center analyst, and (iv) a contact center agent.

15. A non-transitory computer-readable storage medium having computer-executable instructions stored thereupon which, when executed by one or more processors, cause a system to:
initiate creation of a contact center provided by a service executing within a service provider network based at least in part upon information associated with an account of a user of the service provider network, wherein initiation of creation of the contact center comprises populating, by a contact center onboarding service of the service provider network, a template with the information associated with the account of the user at the service provider network for use in creating the contact center;
create an authorized user directory of authorized, wherein the authorized user directory includes one or more authorized users for the contact center;
define aspects of an organization associated with at least the user and the authorized user directory, wherein defining aspects of the organization comprises creating at least one call queue for queuing received customer call and creating a routing profile associated with the call queue that routes calls from the call queue to an initial user;
provide a plurality of phone numbers to the user for selection of a phone number for the contact center; and
following selection of a phone number, associate the organization and the phone number with the contact center to complete creation of the contact center.

16. The non-transitory computer-readable storage medium of claim 15, wherein the computer-executable instructions, when executed by one or more processors, further cause the one or more processors to:
create storage for at least customer call recordings and customer phone numbers at a storage service operating within the service provider network; and
create encryption keys, using a key management service operating within the service provider network for encrypting customer call recordings and customer phone numbers in the storage.

17. The non-transitory computer-readable storage medium of claim 15, wherein the computer-executable instructions, when executed by one or more processors, further cause the one or more processors to create an analytics subscription for a data analytics service operating within the service provider network to provide analytics to the user related to at least call detail records of received customer calls at the contact center.

18. The non-transitory computer-readable storage medium of claim 15, wherein the computer-executable instructions, when executed by one or more processors, further cause the one or more processors to create the organization associated with at least the user directory and the storage by:
   defining the user as the initial user; and
   creating a routing profile associated with the call queue that routes calls from the queue to the initial user.

19. The non-transitory computer-readable storage medium of claim 18, wherein the computer-executable instructions, when executed by one or more processors, further cause the one or more processors to create security profiles for the initial user.

20. The non-transitory computer-readable storage medium of claim 15, wherein the computer-executable instructions, when executed by one or more processors, further cause the one or more processors to create security profiles corresponding to (i) a contact center administrator, (ii) a contact center manage, (iii) a contact center analyst, and (iv) a contact center agent.

* * * * *